(12) United States Patent
Ehrlich

(10) Patent No.: US 6,662,424 B2
(45) Date of Patent: Dec. 16, 2003

(54) METHOD OF ATTACHING A LOGISTICS RAIL TO A TRAILER SIDE WALL

(75) Inventor: Rodney P. Ehrlich, Monticello, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 09/998,840

(22) Filed: Nov. 15, 2001

(65) Prior Publication Data

US 2002/0100171 A1 Aug. 1, 2002

Related U.S. Application Data

(60) Provisional application No. 60/249,086, filed on Nov. 15, 2000.

(51) Int. Cl.[7] ................................................ B23P 11/00
(52) U.S. Cl. ...................... 29/525.01; 29/428; 29/525; 29/897.2
(58) Field of Search .............................. 29/525, 525.01, 29/897.2, 428; 296/181, 182

(56) References Cited

U.S. PATENT DOCUMENTS

| | | | | | |
|---|---|---|---|---|---|
| 3,782,295 A | * | 1/1974 | Balinksi | .................... | 410/149 |
| 3,782,758 A | * | 1/1974 | Williamson, III | ........... | 410/118 |
| RE28,788 E | * | 4/1976 | Williamson, III | ....... | 280/179 R |
| 4,033,268 A | * | 7/1977 | Klekar | ....................... | 410/149 |
| 4,168,667 A | * | 9/1979 | Loomis | ...................... | 410/118 |
| 4,265,577 A | * | 5/1981 | Loomis | ....................... | 410/118 |
| 4,688,976 A | * | 8/1987 | Rowley et al. | ............. | 410/156 |
| 4,781,498 A | * | 11/1988 | Cox | ........................... | 410/118 |
| 4,982,922 A | * | 1/1991 | Krause | .................. | 248/222.51 |
| 5,228,823 A | * | 7/1993 | Crook | ......................... | 414/498 |
| 5,472,300 A | * | 12/1995 | Lipschitz | .................... | 410/139 |
| 5,997,076 A | * | 12/1999 | Ehrlich | ....................... | 296/181 |
| 6,010,020 A | * | 1/2000 | Abal | ........................... | 220/1.5 |
| 6,220,651 B1 | * | 4/2001 | Ehrlich | ....................... | 296/181 |
| 6,412,854 B2 | * | 7/2002 | Ehrlich | ....................... | 296/191 |
| 2002/0101095 A1 | * | 8/2002 | Gosselin et al. | ........... | 296/181 |

FOREIGN PATENT DOCUMENTS

EP 0124807 * 11/1984 .................. 296/181

* cited by examiner

Primary Examiner—Gregory Vidovich
Assistant Examiner—Essama Omgba
(74) Attorney, Agent, or Firm—Trexler, Bushnell, Giangiorgi, Blackstone & Marr, Ltd.

(57) ABSTRACT

A method of attaching a logistics rail to a trailer sidewall is disclosed. The trailer sidewall includes an inner skin, an outer skin, a member mounted between the inner and outer skins, and a core between the inner and outer skins. A vertical channel is formed between the inner skin and the member. The inner skin is cut to expose the channel. Thereafter, the logistics rail is inserted within the member. The logistics rail has a plurality of slots therethrough so that items can be attached to the trailer sidewall. Finally, the logistics rail is attached to the member.

14 Claims, 2 Drawing Sheets

METHOD OF ATTACHING A LOGISTICS RAIL TO A TRAILER SIDE WALL

This application claims the priority of U.S. provisional application Serial No. 60/249,086 filed on Nov. 15, 2000 and entitled "Method Of Attaching A Logistics Rail To A Trailer Side Wall".

BACKGROUND OF THE INVENTION

Logistics rails are provided in trailer sidewalls to secure items thereto. A hook having a strap attached thereto or other like means is inserted through an opening provided in the logistics rail. An item within the trailer is then tied down or otherwise secured by using the strap. In addition, items can be hung from the trailer sidewall.

The present invention provides a novel method of attaching a logistics rail to a side wall of a trailer. Features and advantages of the present invention will become apparent upon a reading of the attached specification in combination with a study of the drawings.

OBJECTS AND SUMMARY OF THE INVENTION

A general object of the present invention is to provide a novel method of attaching a logistics rail to a trailer side wall.

The present invention discloses a novel method of attaching a logistics rail to a trailer sidewall. The trailer sidewall includes an inner skin, an outer skin, a member mounted between the inner and outer skins, and a core between the inner and outer skins. A vertical channel is formed between the inner skin and the member. The inner skin is cut to expose the channel. Thereafter, the logistics rail is inserted within the member. The logistics rail has a plurality of slots therethrough so that items can be attached to the trailer sidewall. Finally, the logistics rail is attached to the member.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT(S)

Figure 1:
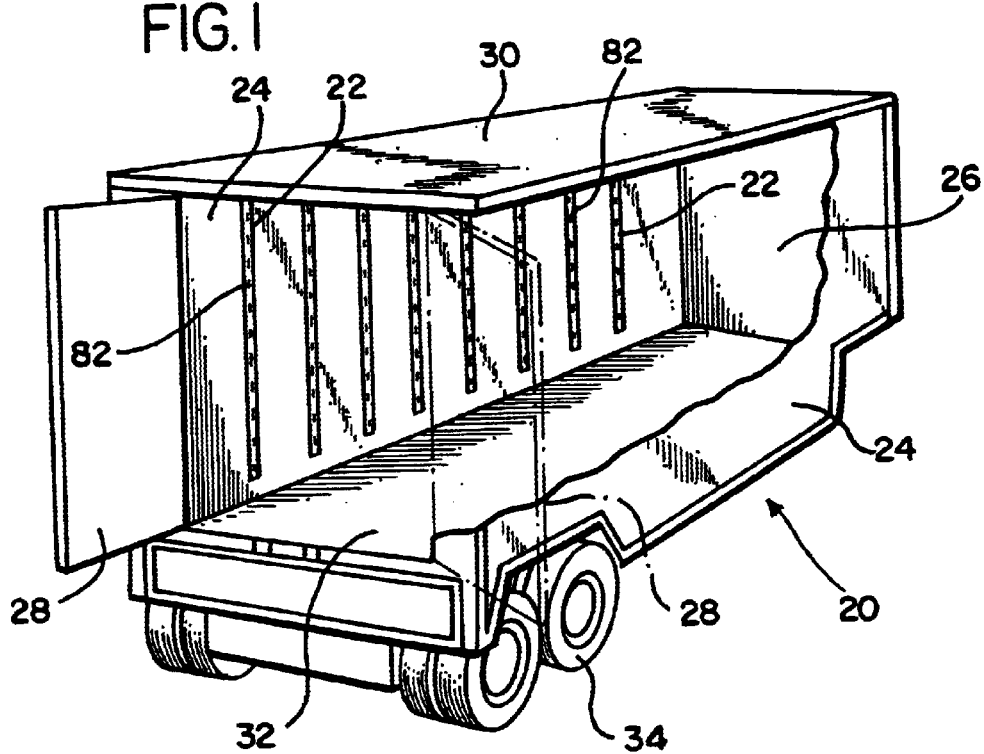
FIG. 1 is a perspective view of a trailer which has a logistics rail attached to the sidewall thereof in accordance with the features of the invention.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

A trailer 20 which has a plurality of logistics rails 22 attached therewithin to the sidewalls 24 in accordance with the present invention is shown in FIG. 1. The trailer 20 can be connected to a tractor (not shown) by conventional means, such as a fifth wheel assembly. The trailer 20 includes a body formed from a pair of rectangular sidewalls 24, a front wall 26, rear doors 28, a top panel or roof 30, and a floor 32. The floor 32 is supported by a conventional rear undercarriage assembly 34 and has a landing gear (not shown) secured thereunder. The top panel 30 and an upper portion of each sidewall 24 is secured to respective top rails in a conventional manner, and the floor 32 and a lower portion of each sidewall 24 is secured to a respective bottom rail in a conventional manner.

Each sidewall 24 includes a core 36 sandwiched between an inner thin skin 38 and an outer thin skin 40. The skins 38, 40 are preferably made of fiber-reinforced plastic or metal, such as aluminum, galvanized, full hardened steel, such as AISI Grade E full hard steel because of its cost effectiveness, or the like. Aluminum may be used, but it may be too soft for some purposes and strength and punch resistance are sacrificed, however, aluminum is lightweight.

Each core 36 is made of some type of compressible non-metal material, preferably thermoplastic, such as polypropylene or high density polyethylene, or foamed thermoplastic as described in Applicant's co-pending U.S. patent application Ser. No. 08/942,173, filed on Oct. 1, 1997, and entitled, "Foamed Core Composite Plate For Use In Trailer Walls And Doors". Preferably, a foamed thermoplastic is used. These materials are relatively inexpensive as compared to aluminum found in prior trailer wall constructions. In addition, because composite sidewalls 24 are used, the weight of the trailer 20 construction is reduced over trailers having aluminum sidewalls. Each core 36 may be bonded to the skins 38, 40 by a suitable known adhesive or other like means.

A plurality of members 42 are mounted between the inner and outer skins 38, 40 of the sidewalls 24 and are spaced apart from each other along the length of each sidewall 24. Each member 42 has a logistics rail 22 attached thereto in accordance with the method of the present invention. Only the structure of one member 42 and its corresponding logistics rail 22 and the attachment of the one member 42 and its corresponding logistics rail 42 is described herein, with the understanding that the others members 42 and other logistics rails 22 used in the trailer 20 construction are formed in an identical manner and the logistics rails 22 are attached to the members 42 using the identical method of the present invention.

The member 42 includes a reinforcement 44 mounted to the outer skin 40 of the sidewall 24 and a channel element 46 mounted to the inner skin 38 of the sidewall 24 such that the member 42 is between the inner and outer skins 38, 40 of the sidewall 24. The reinforcement 44 and the channel element 46 are connected together.

The reinforcement 44 is generally "Z" shaped and extends vertically along the height of the sidewall 24. The reinforcement 44 includes a first leg 48 that is parallel to the outer skin 40 and is bonded thereto by adhesive 50, a second leg 52 which extends perpendicularly to the first leg 48, and a third leg 54 which extends perpendicularly to the second leg 52 and is parallel to the first leg 48 and to the outer skin 40. The reinforcement 44 does not span the entire thickness of the sidewall 24. Preferably, the reinforcement 44 is integrally formed of suitable material, such as fiber-reinforced plastic or metal.

Figure 2:
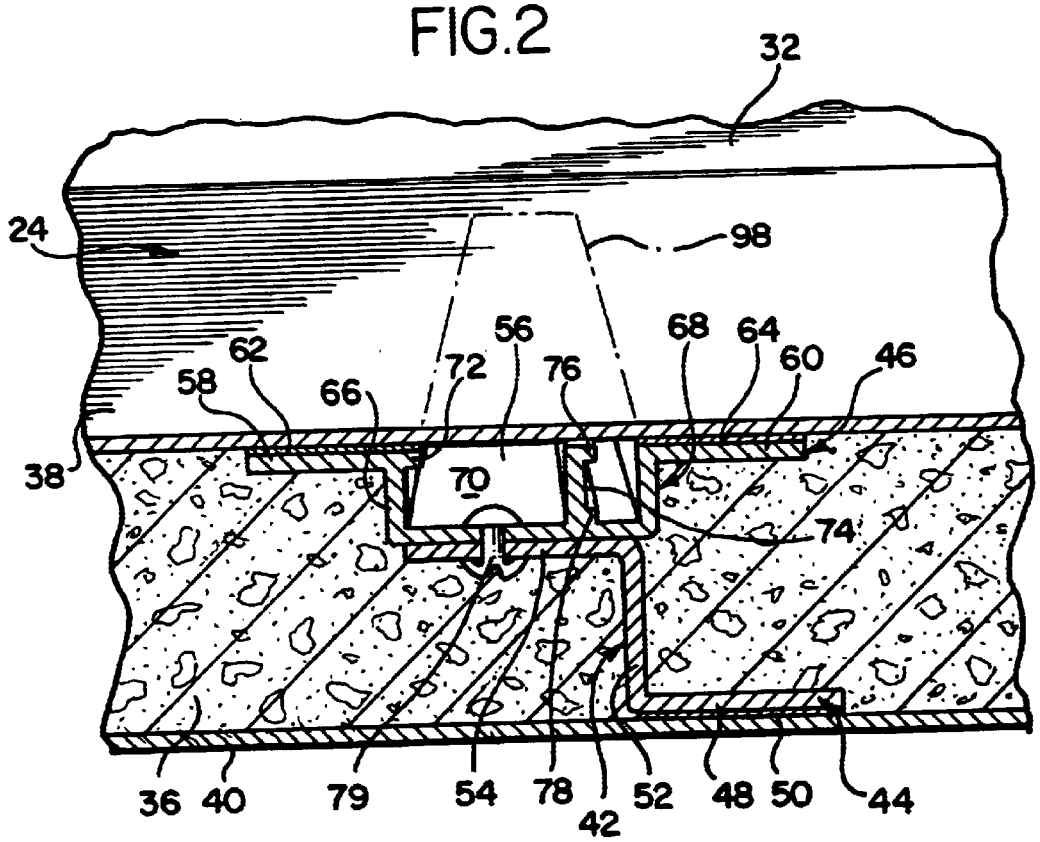
FIGS. 2–5 are perspective views of the logistics rail and a portion of the trailer sidewall as the logistics rail is being assembled with the trailer sidewall.
Figure 3:
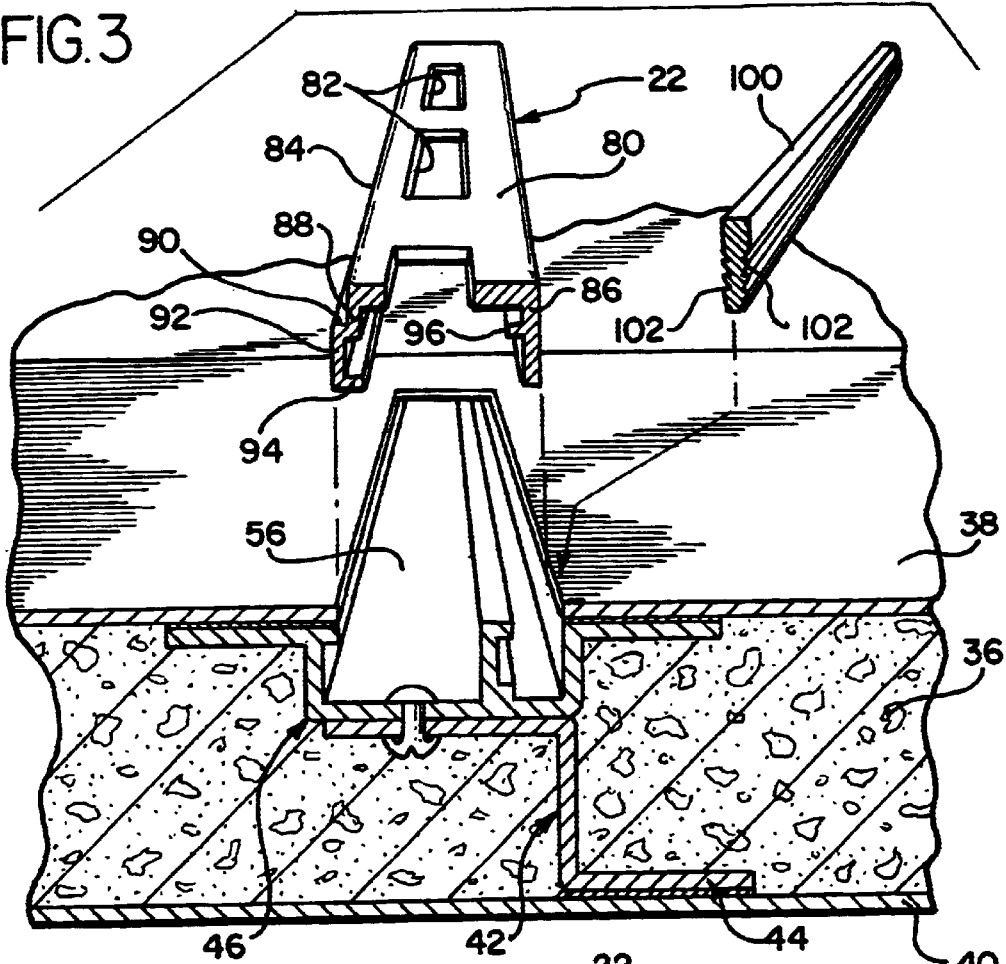

As shown in FIG. 2, the channel element 46 provides a vertical channel 56 between the inner skin 38 and the channel element 46. The channel element 46 includes opposite ends portions 58, 60 which are respectively secured to the inner skin 38 of the sidewall 24 by adhesive 62, 64 and are spaced apart from each other, opposite side portions 66, 68 which extend perpendicularly from the inner skin 38 and the respective end portions 58, 60 toward the outer skin 40, and a back portion 70 which is connected to the ends of the side portions 66, 68 and is spaced from the inner skin 38. The back portion 70 extends perpendicularly from the side portions 66, 68 and parallel to the end portions 58, 60 and the inner skin 38. Side portion 66 has a short flange 72 proximate to the end portion 58, which is perpendicular to the side portion 66, and extends inwardly therefrom into the channel 56. An intermediate portion 74 extends perpendicularly from the back portion 70 and is provided between the opposite side portions 66, 68 and is spaced from each of the side portions 66, 68. The intermediate portion 74 divides the channel 56 into two sections. At the free end of the intermediate portion 74, a first short flange 76 is provided thereon and extends perpendicularly therefrom towards the side portion 68. At the end of the intermediate portion 74 which is connected to the back portion 70, a second short flange 78 is provided which extends perpendicularly therefrom towards the side portion 68. Preferably, the channel element 46 is integrally formed of suitable material, such as fiber-reinforced plastic or metal.

The third leg 54 of the reinforcement 44 is connected to the back portion 70 of the channel element 46 by suitable means, such as a plurality of rivets 79, to secure the reinforcement 44 and the channel element 46 together. This completes the construction of the sidewall 24.

The logistics rail 22 has a base wall 80 which has a plurality of slots 82 therethrough so that items can be attached to the sidewalls 24 of the trailer 20 after the logistics rail 22 is attached thereto. A first side wall 84 extends from one end of the base wall 80 and a second side wall 86 extends from the other end of the base wall 80. The first side wall 84 has a first portion 88 which is perpendicular to the base wall 80, a second portion 90 which is perpendicular to the first portion 88 and is parallel to the base wall 80, a third portion 92 which is perpendicular to the second portion 90 and parallel to the first portion 88, and a fourth portion 94 which is perpendicular to the third portion 92 and is parallel to the second portion 90. The second side wall 86 extends perpendicularly from the other end of the base wall 80. The second side wall 86 has short flange 96 along the length thereof which is spaced a predetermined distance from the base wall 80. The flange 96 extends perpendicularly from the second side wall 86 toward the other side wall 84 and is parallel to the base wall 80.

When the sidewall 24 is built, each member 42 is within the sidewall 24 between the skins 38, 40 such that the inner skin 38 completely overlays the channel element 46. Thus, the channel 56 is between the channel element 46 and the inner skin 38.

The inner skin 38 is cut along outline 98 by suitable cutting means to expose the channel 56 to the inside of the trailer 20. The outline 98 corresponds to the length of the channel element 46 and the width between the free end of the flange 72 and the inner surface of the side portion 68.

Figure 4:
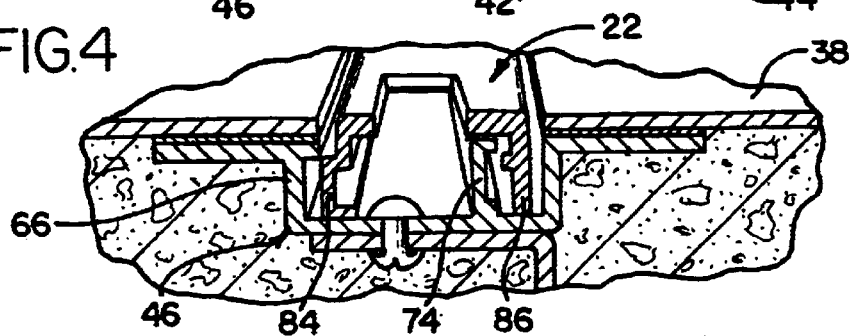
Figure 5:
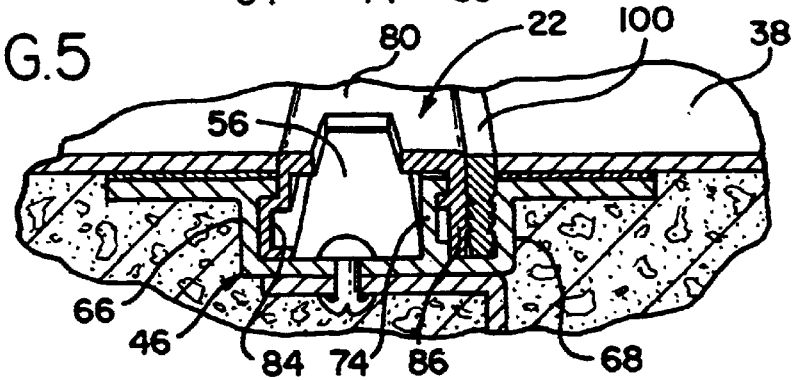

Next, the logistics rail 22 is inserted within the channel element 46, FIG. 4. When inserted, the first side wall 84 of the logistics rail 22 is between the side portion 66 and the intermediate portion 74 of the channel element 46, and the second side wall 86 of the logistics rail 22 is between the intermediate portion 74 and the side portion 68 of the channel element 46. The logistics rail 22 has a width that is less than the width of the channel 56.

Thereafter, the logistics rail 22 is moved within the channel 56 towards the side portion 66 of the channel element 46 until the first portion 88 of the side wall 84 of the logistics rail 22 abuts against the short flange 72 and the third portion 92 of the side wall 84 of the logistics rail 22 abuts against the side portion 66 of the channel element 46. The second portion 90 of the side wall 84 of the logistics rail 22 seats under the short flange 72. The flange 96 on the side wall 86 of the logistics rail 22 seats under the flange 76 on the intermediate portion 74 of the channel element 46. Because the width of the logistics rail 22 is less than the width of the channel 56, a space is created between the side wall 86 of the logistics rail 22 and the side portion 68 of the channel member 46.

A piece 100 having plurality of one-way barbs 102 thereon is inserted between the side wall 86 of the logistics rail 22 and the side portion 68 of the channel element 46. The one-way barbs 102 on the piece 100 engage with the intermediate portion 74 of the logistics rail 22 and with the side portion 68 of the channel element 46 such that the space is completely filled. This prevents removal of the piece 100 from engagement with the logistics rail 22 and the channel element 46 and completes the assembly of the logistics rail 22 with the member 42.

After the logistics rail 22 is attached to the member 42, a flush surface is provided along the length of the inner surface of the sidewall 24. The portion of the channel 56 between the intermediate portion 74 of the channel element 46 and the side wall 84 of the logistics rail 22 is not filled such that a space is provided behind the openings 82 in the logistics rail 22. This allows for items, such as a hook with a strap attached thereto, to be connected to the logistics rail 22.

While a preferred embodiment of the present invention is shown and described, it is envisioned that those skilled in the art may devise various modifications of the present invention without departing from the spirit and scope of the appended claims.

The invention claimed is:

1. A method of attaching a logistics rail to a trailer sidewall comprising the steps of:
   providing a trailer sidewall comprising an inner skin, an outer skin, a member mounted between said inner and outer skins, a vertical channel being formed between said inner skin and said member, and a core between said inner and outer skins;
   cutting said inner skin thereby exposing said channel;
   inserting a logistics rail within said channel, said logistics rail having at least one slot therethrough; and
   attaching said logistics rail to said member.

2. A method as defined in claim 1, wherein said member includes means thereon for accepting a portion of said logistics rail therein; and
   wherein during said step of attaching said logistics rail to said member, said logistics rail is inserted into said member and moved such that a portion of said logistics rail is accepted into said means on said member.

3. A method as defined in claim 2, wherein during said step of attaching said logistics rail to said member, a piece is inserted between said logistics rail and said member after said logistics rail is moved.

4. A method as defined in claim 3, wherein said piece has a plurality of one-way barbs thereon such that when said piece is inserted between said logistics rail and said member, the barbs engage with said logistics rail and said member to prevent removal of said piece therefrom.

5. A method as defined in claim 2, wherein said member includes opposite side portions which extend from said inner skin toward said outer skin, a back portion which is connected to said side portions and spaced from said inner skin, and an intermediate portion between said opposite side portions and spaced therefrom, said intermediate portion having said means thereon.

6. A method as defined in claim 2, wherein said member includes opposite side portions which extend from said inner skin toward said outer skin, and a back portion which is connected to said side portions and spaced from said inner skin, one of said side portions having said means thereon.

7. A method as defined in claim 1, wherein said member includes first means thereon for accepting a first portion of said logistics rail therein and second means thereon for accepting a second portion of said logistics rail therein; and wherein during said step of attaching said logistics rail to said member, said logistics rail is inserted into said member and moved such that a first portion of said logistics rail is accepted into said first means on said member and a second portion of said logistics rail is accepted into said second means on said member.

8. A method as defined in claim 7, wherein during said step of attaching said logistics rail to said member, a piece is inserted between said logistics rail and said member after said logistics rail is moved.

9. A method as defined in claim 8, wherein said piece has a plurality of one-way barbs thereon such that when said piece is inserted between said logistics rail and said member, the barbs engage with said logistics rail and said member to prevent removal of said piece therefrom.

10. A method as defined in claim 7, wherein said member includes opposite side portions which extend from said inner skin toward said outer skin, one of said side portions having said first means thereon, a back portion which is connected to said side portions and spaced from said inner skin, and an intermediate portion between said opposite side portions and spaced therefrom, said intermediate portion having said second means thereon.

11. A method as defined in claim 1, wherein said member includes a reinforcement mounted to said outer skin and a channel element mounted to said inner skin, said channel element providing said channel, said reinforcement and said channel element being connected together.

12. A method as defined in claim 11, wherein said reinforcement is adhesively bonded to said outer skin and said channel member is adhesively bonded to said inner skin.

13. A method as defined in claim 1, wherein after said logistics rail is attached to said member, a flush inner surface is provided along the length of the sidewall.

14. A method as defined in claim 1, wherein said logistics rail includes a plurality of slots.

* * * * *